United States Patent [19]
Rayment

[11] 3,751,001
[45] Aug. 7, 1973

[54] APPARATUS FOR CONTROLLING A FLOW OF PRESSURE FLUID

[75] Inventor: Arthur George Rayment, Kent, England

[73] Assignee: Gunson's Sortex Limited, London, England

[22] Filed: Nov. 5, 1971

[21] Appl. No.: 195,962

[30] Foreign Application Priority Data
Nov. 11, 1970  Great Britain.................. 53,702/70

[52] U.S. Cl................................. 251/141, 251/129
[51] Int. Cl............................................ F16k 31/08
[58] Field of Search............................ 251/141, 129; 137/83

[56] References Cited
UNITED STATES PATENTS
1,957,585  5/1934  Gratian......................... 251/129 X
2,990,839  7/1961  Ray................................... 137/83 X
3,386,472  6/1968  Szonntagh...................... 251/141 X
3,665,962  5/1972  Dornseiffen .................... 251/129 X
1,286,059  11/1918  Morris ............................ 251/129 X Primary Examiner—Arnold Rosenthal
Attorney—Cushman, Darby & Cushman

[57] ABSTRACT

An electromagnetic valve for a sorting machine has a chamber in which there is a valve disc. The valve disc is urged to an open position by the energisation of a solenoid and in the open position pressure fluid may leave the chamber through an exit. In the closed position a portion of the edge of the valve disc prevents flow of pressure fluid from the chamber. The valve disc may be replaced by a tubular member.

8 Claims, 4 Drawing Figures

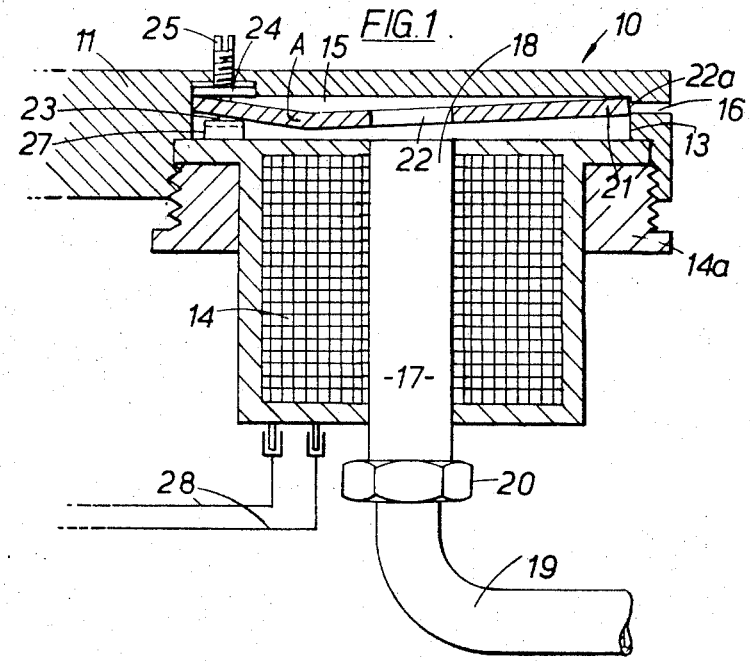
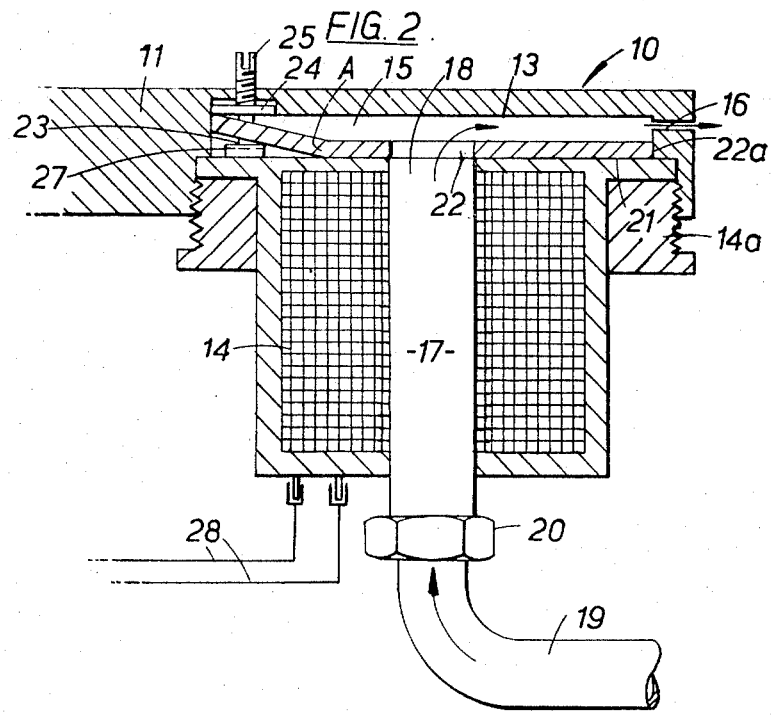
Inventor
ARTHUR GEORGE RAYMENT
By Cushman Darby Cushman
Attorneys

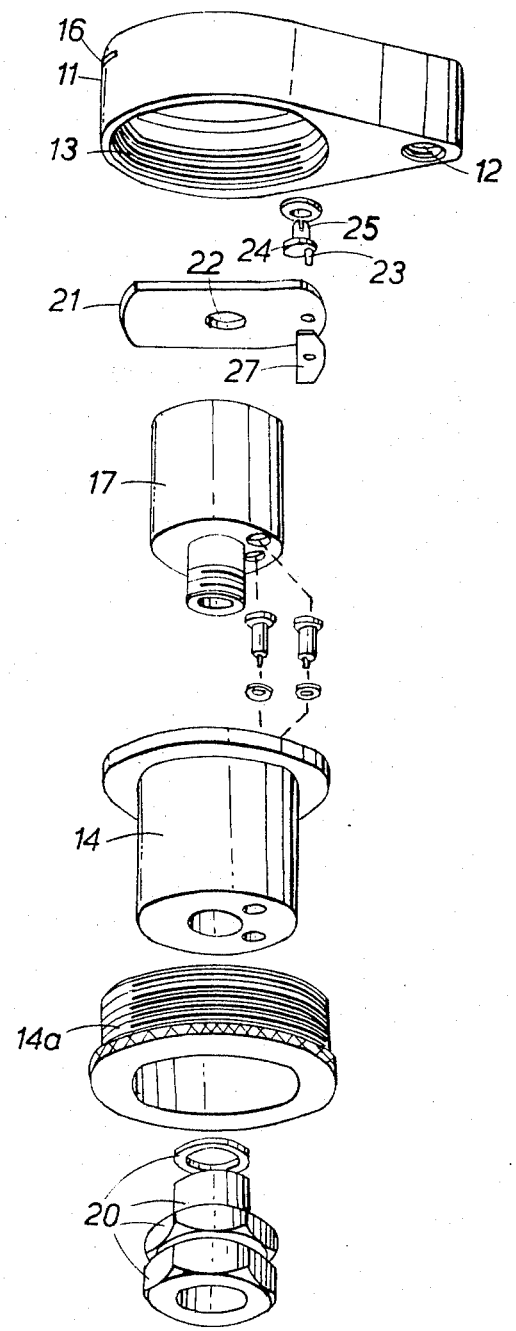

APPARATUS FOR CONTROLLING A FLOW OF PRESSURE FLUID

This invention concerns an apparatus for controlling the flow of a pressure fluid, and, although the invention is not so restricted, it is more particularly concerned with an ejector device of a sorting machine, the ejector device being adapted to direct compressed air at predetermined material to be sorted.

According to one aspect of the present invention there is provided an apparatus for controlling the flow of a pressure fluid, the apparatus comprising: a chamber; means defining an inlet through which pressure fluid may be supplied to the chamber; means defining an outlet through which pressure fluid may exit from the chamber; a valve disc having an edge region disposed within the chamber; means for mounting the valve disc at a position adjacent a first portion of the edge region whereby the valve disc is capable of pivotal movement between a first position and a second position, the valve disc being urged towards the first position; a solenoid device which, when energized, causes the valve disc to move to the second position; and a second portion of the edge region, substantially opposite to the first portion of the edge region, the second portion of the edge region in one of the positions of the valve disc preventing flow of the pressure fluid from the chamber to the outlet and in the other position of the valve disc permitting flow of the pressure fluid from the chamber to the outlet.

The valve disc may be so shaped that when it is in the said other position it is in a stressed condition which urges the valve disc towards said one position. Additionally, or alternatively, the said inlet may be so positioned as to cause pressure fluid to urge the valve disc towards said one position.

The valve disc is, preferably, annular, so that in the second position pressure fluid may flow from the inlet to the outlet through the valve disc.

In a preferred embodiment, the said other position is the second position, the valve disc being urged towards the first position.

The apparatus may include means for adjusting the position of the said second portion of the edge region of the valve disc relative to the outlet when the valve disc is in said one position.

The outlet may be in the form of a convergent-divergent nozzle having an inlet end for receiving pressure fluid from the chamber, a throat portion and an outlet end.

Preferably, said nozzle is so dimensioned as to provide a supersonic flow of gaseous pressure fluid at the outlet end.

The invention is illustrated, merely by way of example, in the accompanying drawings, in which:

FIG. 1 shows, partly in cross-section, an apparatus for controlling the flow of a pressure fluid, with a valve disc thereof in the closed position;

FIG. 2 is similar to FIG. 1 but with the valve disc in the open position;

FIG. 3 is an exploded perspective view of the apparatus of FIGS. 1 and 2 (FIG. 3 is, in fact, a mirror image of FIGS. 1 and 2)

Figure 4:
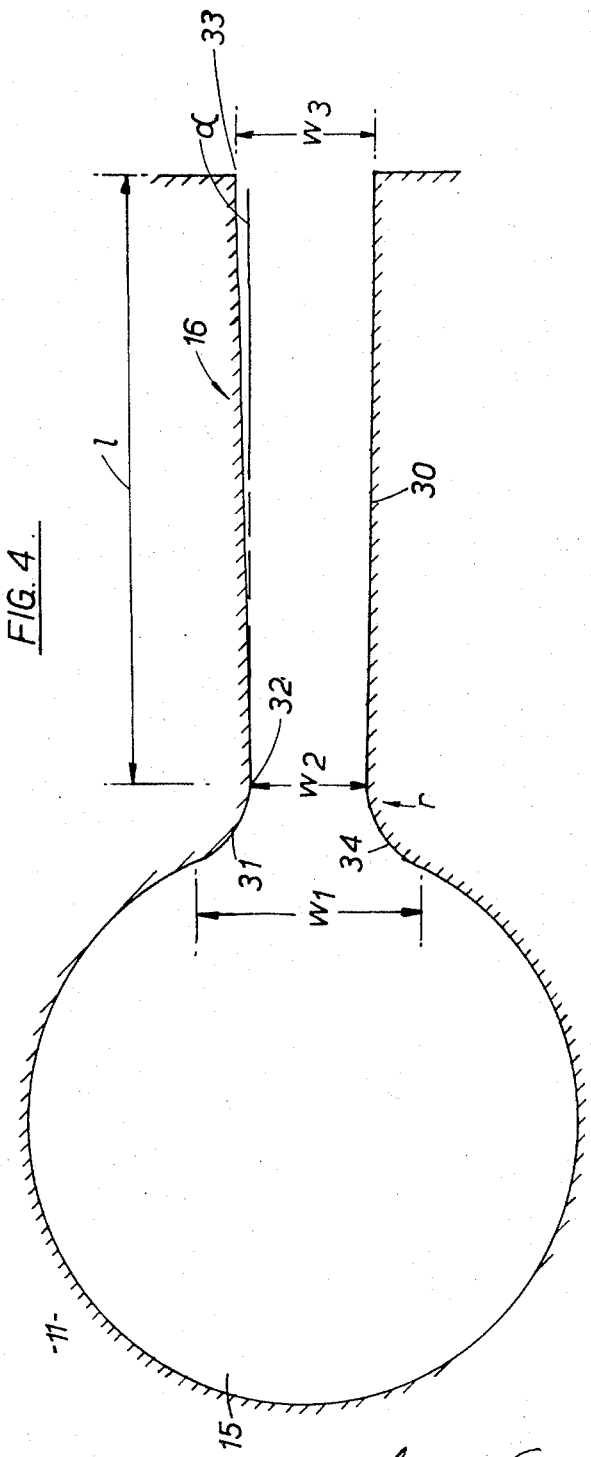
FIG. 4 is a part of a further embodiment of an apparatus for controlling the flow of pressure fluid according to the present invention.

Referring to FIGS. 1 to 3 of the accompanying drawings, there is shown an apparatus for controlling the flow of a pressure fluid, the apparatus being generally designated by the reference numeral 10. The apparatus 10 comprises a housing 11 which, as seen in FIG. 3, is substantially pear-shaped in cross-section and which is provided with an internally screw-threaded aperture 12 to enable it to be connected to fixed structure (not shown). The housing 11 has a cavity 13 therein which, in conjunction with an electromagnetic solenoid 14, defines a chamber 15. An outlet 16, which is in the form of an arcuate slot, is provided in the housing 11. The solenoid 14 is rigidly connected to the housing 11 by means of an externally screw-threaded boss 14a which screws into internal screw-threads formed in the cavity 13. A pressure fluid supply pipe 17 is coaxial with and disposed internally of the solenoid 14, and the upper end (as seen in the drawings) forms an inlet 18 for pressure fluid, e.g., compressed air to the chamber 15. The supply pipe 17 is connected to external piping 19 by way of a connector 20.

A valve disc 21 is positioned in the chamber 15, the valve disc being annular with an aperture 22 in the centre thereof. The valve disc may be made of steel sheet. The valve disc 21 is bent at a position A, and is movable between open and closed positions in which the flow of the pressure fluid from the chamber 15 to the outlet 16 is respectively permitted and prevented. FIG. 1 shows the valve disc in the closed position and FIG. 2 shows the valve disc in the open position. In the closed position, a portion 2a of the edge of the valve disc obstructs the outlet 16 to prevent flow of pressure fluid from the chamber.

The valve disc is pivotally mounted, at a position opposite or substantially opposite the portion 2a of the edge of the valve disc, on a boss 23 which is eccentrically mounted on a disc member 24. A grub-screw 25 is connected to the disc member 24 and extends through the housing 11. Due to the fact that the boss 23 is eccentrically mounted on the disc member 24, rotation of the grub-screw 25 adjusts the position of portion 2a of the edge of the valve disc relative to the outlet 16, so that, when the valve disc is in the closed position pressure fluid can be prevented from passing through the outlet even though the valve disc may have become worn during its operation. Also mounted on the boss 23 is a spring member 27, which may be made of phosphor-bronze, the spring urging the valve disc 21 towards the closed position.

When the solenoid 14 is energised by means of electrical power supplied through leads 28, the valve disc 21 moves to the open position shown in FIG. 2. Thus pressure fluid from the external piping 19 passes through the supply pipe 17, the inlet 18, the aperture 22 in the valve disc 15 and into the chamber 21 from whence it flows to the exterior of the apparatus through the outlet 16 in the form of a jet (the flow of pressure fluid is shown by arrows in FIG. 2). In the open position, the valve disc 21 is in a stressed condition as also is the spring member 27 and thus the valve disc 21 is urged towards the closed position; however, movement of the valve disc 21 is prevented whilst the solenoid is energised.

When the solenoid 14 is de-energised, initially the stressed condition of the valve disc 21 and the spring member 27 causes the valve disc 21 to move towards the closed position. As soon as the valve disc and the solenoid 14 become spaced apart, pressure fluid occupies the space and further assists in moving the valve disc to its closed position.

Referring now to FIG. 4, there is shown a part of a further embodiment of an apparatus for controlling the flow of a pressure fluid. Parts of the apparatus shown in FIG. 4 similar to parts of the apparatus shown in FIGS. 1 to 3 have been designated by the same reference numerals. FIG. 4 is, in fact, a cross-section through the chamber 15 and outlet 16 omitting the valve disc 21 for clarity; the parts of the apparatus not shown in FIG. 4 may be the same as the corresponding parts of the apparatus of FIGS. 1 to 3.

The outlet 16 is in the form of a convergent-divergent nozzle 30, having an inlet end 31, the width of which is indicated by $w_1$, a throat 32, the width of which is indicated by $w_2$, and an outlet end 33, the width of which is indicated by $w_3$. The angle of divergence of the nozzle 30 is indicated by $\alpha$ and the length of the nozzle from the throat 32 to the outlet end 33 is indicated by $l$. The nozzle 30 is rectangular in section, the depth of the nozzle being perpendicular to the plane of FIG. 4.

The walls of the nozzle 30 are continuous with the walls of the chamber 31 there being arcuate portions 34 therebetween. The radius of each arcuate portion is the same and is indicated by $r$.

The nozzle 30 may be so constructed as to produce a supersonic flow of gaseous pressure fluid at the outlet end 33. To achieve this end, the dimensions of the nozzle 30 and chamber 15 may be as follows:

| | |
|---|---|
| diameter of chamber 15 | 1.880–1.887 inches |
| $w_1$ | 0.750 inches |
| $w_2$ | 0.375 inches |
| $w_3$ | 0.470 inches |
| $l$ | 2.0 inches |
| $r$ | 0.343 inches |
| $\alpha$ | 1°20' |
| depth of the nozzle 30 | 0.048 inches |

With such a construction the aspect ratio is 9.8 and, if the fluid is air with a flow rate of 12 ft³/minute at S.T.P. and the supply pressure, i.e., the pressure in the piping 19, is 63.4 lbs/sq.in. absolute, then the velocity of air at the outlet end 33 will be supersonic.

It will be appreciated that the above apparatus has a low impedance to pressure fluid flowing therethrough since the only major restriction to flow is the outlet 16 itself. Furthermore, there is no substantial pressure to overcome to move the valve disc from its closed position to its open position since the pressure fluid, in the closed position, acts on both sides of the valve disc 21. In addition, the stressed condition of the valve disc in the open position, increases the speed at which the valve disc will move from its open position to its closed position. Finally it will be seen that the apparatus may be made very compact. To sum up, therefore, the above apparatus can be operated very rapidly and this is especially important when the apparatus constitutes the ejector of a sorting machine (not shown), the ejector being adapted to direct compressed air at predetermined material being sorted.

The valve disc 21 has been illustrated as being annular with a circular cross-section. It will, however, be appreciated that the valve disc 21 can be of other shapes, e.g., square or rectangular. However, in all events, the cavity 13 in the housing 11 must conform to the shape of the valve disc.

It will also be appreciated that the solenoid 14 instead of moving the valve disc from its closed position to its open position may, if desired, move the valve disc from its open position to its closed position.

The above apparatus has to the further advantage of having a long operational life because none of the parts is subject to a high pressure impact.

What is claimed is:

1. An apparatus for controlling the flow of a pressure fluid, the apparatus comprising: a chamber; means defining an inlet through which pressure fluid may be supplied to the chamber; means defining an outlet through which pressure fluid may exit from the chamber; a valve disc having an edge region disposed within the chamber; means for mounting the valve disc at a position adjacent a first portion of the edge region whereby the valve disc is capable of pivotal movement between a first position and a second position, the valve disc being urged towards the first position; a solenoid device which, when energized, causes the valve disc to move to the second position; and a second portion of the edge region, substantially opposite to the first portion of the edge region, the second portion of the edge region in one of the positions of the valve disc preventing flow of the pressure fluid from the chamber to the outlet and in the other position of the valve disc permitting flow of the pressure fluid from the chamber to the outlet.

2. An apparatus as claimed in claim 1 in which the valve disc is so shaped that when it is in the said other position it is in a stressed condition which urges the valve disc towards said one position.

3. An apparatus as claimed in claim 1 in which the said inlet is so positioned as to cause pressure fluid to urge the valve disc towards said one position.

4. An apparatus as claimed in claim 1 in which the valve disc is annular, so that in the second position pressure fluid may flow from the inlet to the outlet through the valve disc.

5. An apparatus as claimed in claim 1 in which the said other position is the second position, the valve disc being urged towards the first position.

6. An apparatus as claimed in claim 1 including means for adjusting the position of the said second portion of the edge region of the valve disc relative to the outlet when the valve disc is in the said one position.

7. An apparatus as claimed in claim 1 in which the outlet is in the form of a convergent-divergent nozzle having an inlet end for receiving pressure fluid from the chamber, a throat portion and an outlet end.

8. An apparatus as claimed in claim 7 in which said nozzle is so dimensioned as to provide a supersonic flow of gaseous pressure fluid at the outlet end.

* * * * *